US010051307B2

(12) United States Patent
Cao et al.

(10) Patent No.: US 10,051,307 B2
(45) Date of Patent: Aug. 14, 2018

(54) MEDIA SELECTION BASED ON CONTENT OF BROADCAST INFORMATION

(71) Applicant: International Business Machines Corporation, Armonk, NY (US)

(72) Inventors: Feng Cao, Shanghai (CN); Changrui Ren, Beijing (CN); Wei Sun, Beijing (CN); Chun hua Tian, Beijing (CN); Jing Min Xu, Beijing (CN); Jizheng Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/551,239

(22) Filed: Nov. 24, 2014

(65) Prior Publication Data
US 2015/0156530 A1 Jun. 4, 2015

(30) Foreign Application Priority Data

Nov. 29, 2013 (CN) .......................... 2013 1 0632297

(51) Int. Cl.
*H04N 21/4147* (2011.01)
*H04N 21/431* (2011.01)
(Continued)

(52) U.S. Cl.
CPC ..... *H04N 21/4147* (2013.01); *H04N 21/4316* (2013.01); *H04N 21/44204* (2013.01);
(Continued)

(58) Field of Classification Search
CPC ................................. H04N 21/2668
See application file for complete search history.

(56) References Cited

U.S. PATENT DOCUMENTS 6,952,496 B2* 10/2005 Krumm .............. G06K 9/00228
382/165
7,051,352 B1* 5/2006 Schaffer ................. H04N 7/163
348/E7.061
(Continued)

FOREIGN PATENT DOCUMENTS

EP 1207695 B1 11/2011
WO 9952285 A1 10/1999

OTHER PUBLICATIONS

Bozios et al., "Advanced Techniques for Personalized Advertising in a Digital TV Environment: The iMEDIA System", provided in Search dated Jun. 5, 2013.
(Continued)

*Primary Examiner* — Nathan Flynn
*Assistant Examiner* — Alexander Q Huerta
(74) *Attorney, Agent, or Firm* — Daniel R. Simek

(57) ABSTRACT

According to the technical solution of an embodiment of the present invention, since content information is transmitted synchronously with the program scene, within the broadcast stream of data, media data, for example, advertisements, which may be of interest to the user, can be analyzed by selecting scenes at a granular level from the broadcast information. In one regard, the selected scene is being played currently, enhancing the relevance of the real-time analysis. In another regard, selecting a reduced granularity avoids statistical information overshadowing individual information. In this way, the accuracy of selecting media data with respect to a current user is improved.

19 Claims, 3 Drawing Sheets

(51) Int. Cl.
*H04N 21/442* (2011.01)
*H04N 21/462* (2011.01)
*H04N 21/482* (2011.01)
*H04N 21/81* (2011.01)

(52) U.S. Cl.
CPC ... *H04N 21/44213* (2013.01); *H04N 21/4622* (2013.01); *H04N 21/4826* (2013.01); *H04N 21/8133* (2013.01)

(56) References Cited

U.S. PATENT DOCUMENTS

| | | | |
|---|---|---|---|
| 7,356,830 B1* | 4/2008 | Dimitrova | G06F 17/30787 375/E7.001 |
| 8,073,380 B2 | 12/2011 | Koli et al. | |
| 8,266,183 B2* | 9/2012 | Watanabe | G06F 17/30781 707/796 |
| 8,296,793 B2 | 10/2012 | Johnson | |
| 8,413,183 B2 | 4/2013 | Kunkel et al. | |
| 8,578,426 B2 | 11/2013 | Tiongson et al. | |
| 8,949,871 B2 | 2/2015 | Chai et al. | |
| 2002/0100063 A1* | 7/2002 | Herigstad | H04N 7/163 725/141 |
| 2004/0019524 A1* | 1/2004 | Marshall | 705/14 |
| 2004/0073924 A1 | 4/2004 | Pendakur | |
| 2006/0225088 A1* | 10/2006 | Gutta, Sr. | H04H 60/372 725/14 |
| 2007/0113243 A1 | 5/2007 | Brey | |
| 2007/0204292 A1 | 8/2007 | Riedl et al. | |
| 2009/0006368 A1* | 1/2009 | Mei | G06F 17/30796 |
| 2009/0022472 A1* | 1/2009 | Bronstein | G06K 9/00751 386/278 |
| 2009/0183210 A1* | 7/2009 | Andrade | 725/87 |
| 2009/0300675 A1 | 12/2009 | Shkedi | |
| 2010/0071005 A1* | 3/2010 | Kusunoki | G06F 17/30781 725/46 |
| 2010/0162286 A1* | 6/2010 | Berry | H04H 60/33 725/14 |
| 2010/0186028 A1* | 7/2010 | Moore | G06Q 30/02 725/32 |
| 2010/0199295 A1* | 8/2010 | Katpelly | H04L 67/306 725/14 |
| 2011/0093337 A1* | 4/2011 | Granit | G06Q 30/0251 705/14.53 |
| 2012/0047530 A1 | 2/2012 | Shkedi | |
| 2012/0096489 A1 | 4/2012 | Shkedi | |
| 2013/0086608 A1 | 4/2013 | Slaney et al. | |
| 2013/0227600 A1* | 8/2013 | Kamimaeda | H04N 21/25891 725/14 |
| 2014/0229968 A1* | 8/2014 | Francisco | H04N 21/441 725/16 |
| 2015/0310307 A1* | 10/2015 | Gopalan | G06K 9/6215 382/103 |
| 2017/0318344 A9* | 11/2017 | Berry | H04N 21/4668 |

OTHER PUBLICATIONS

Rouse, Margaret, "EBIF (Enhanced TV Binary Interchange Format)", last updated Jul. 2011, <http://whatis.techtarget.com/definition/EBIF-Enhanced-TV-Binary-Interchange-Format>.

Shah, Agam, "Intel hopes to trump cable TV packages with new set-top box", Mar 21, 2013, <http://www.techhive.com/article/2031492/intel-hopes-to-trump-cable-tv-packages-with-new-settop-box.html>.

China Patent Application 201310632297.9 (English Translation), titled "Method and Apparatus for Processing Broadcast Information", Filed Nov. 29, 2013.

* cited by examiner

MEDIA SELECTION BASED ON CONTENT OF BROADCAST INFORMATION

BACKGROUND OF THE INVENTION

The present invention relates to data mining, and more specifically, to selection of media for presentation to a user.

When propagating information by means of broadcast, a base station includes in a unified information stream, the information that is expected to be propagated to terminals, and a terminal selects a part of information from the information stream. Here, the base station refers to the party that creates and sends broadcast information. Since it is avoided that the base station propagates different contents to different terminals, broadcast-based information propagation has a higher propagation rate over Internet-based information propagation. For example, high definition (HD) films can be propagated via cable television (TV) channels, whereas the rate of internet-based channels is far from supporting HD films.

It is known for a terminal, receiving broadcast information, to have recommendation functionality. A common practice is to arrange a user profile memory in the terminal for storing user profiles and making recommendations according to the profiles. A cable TV channel and a set-top box are an example of a broadcast channel and a terminal receiving broadcast information. A user profile stored in the set-top box might reveal that most of the cable TV programs being played are documentaries. Based thereon the set-top box may consider that the user is quite interested in documentaries, and thus plays to the user information on a new documentary to be played. The information on the new documentary is one example of media data. The set-top box may play to the user video that introduces the new documentary to be played in the interval of a current program the user is watching, e.g. advertisement time. Also the set-top box may display text that introduces the new documentary in a specific area of the screen.

The base station may include in cable TV channels correlated information expected to be played to users, and then broadcast it to all users together with cable TV programs. Further, the set-top box may arrange a correlated information memory for storing correlated information, or advertising media, also referred to herein as media data, which cable TV operators want to play to users. In this way, cable TV channels do not have to always include correlated information. The base station includes latest correlated information in cable TV channels at regular intervals so that the set-top box can update its local correlated information memory. As described above, correlated information may be video or text. Given tag(s) is attached to each piece of correlated information, for representing content the correlated information is used to recommend. According to the user profile and the tags, the set-top box thus can select correlated information played to the user from correlated information contained in cable TV channels or locally stored correlated information.

SUMMARY

According to one embodiment of the present invention, a method, computer program product, and system for processing broadcast information is provided. The method for processing broadcast information includes a processor that receives broadcast information including a recorded television program and a set of content information, the set of content information indicating at least a first component of a target scene of the recorded television program. The processor determines media data, based, at least in part, on the first component of the target scene, and presents the media data with a display of the target scene.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
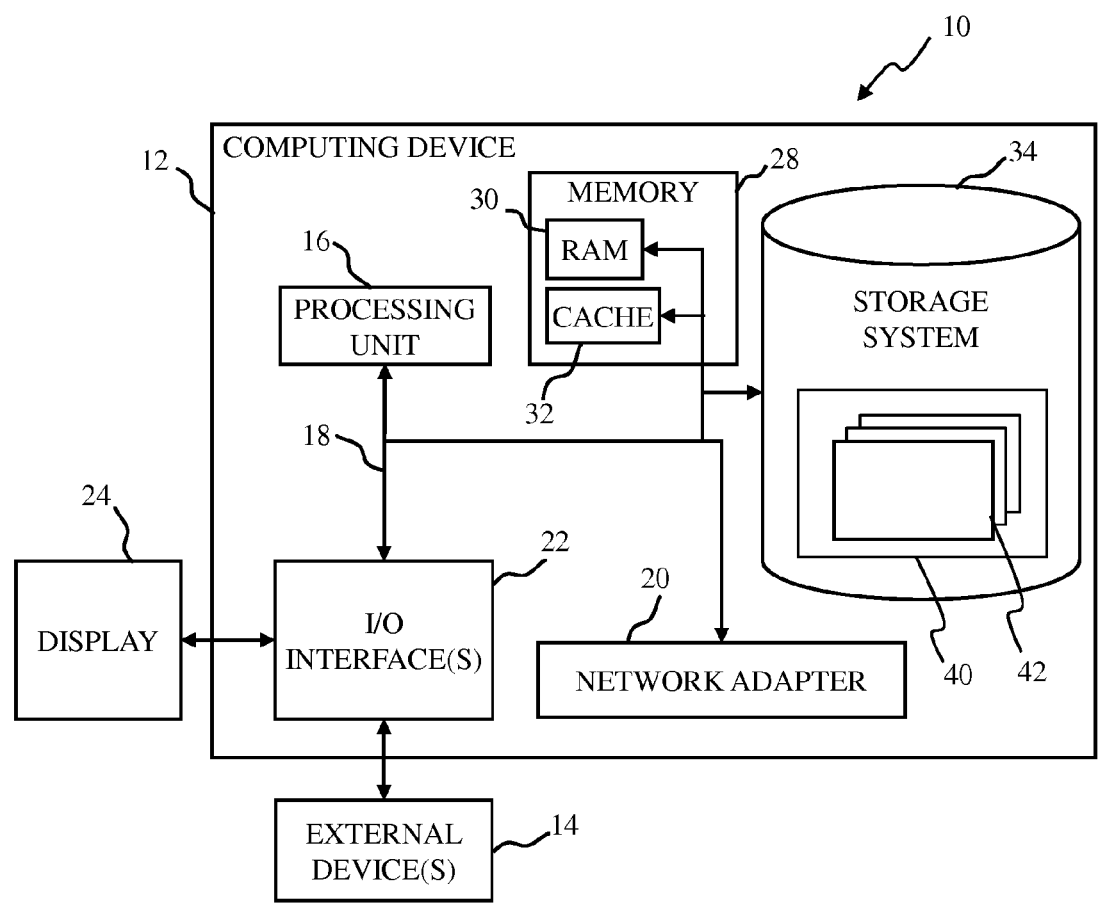
FIG. 1 shows an exemplary computer system/server which is applicable to implement the embodiments of the present invention.

Some embodiments of the present invention recognize that conventional practice makes recommendation at a granularity of programs, that is, media data is selected according to the program being viewed. In fact, however, the user might only have interest in some portions of the program and even some elements of a particular scene. Additionally, various users may use the same set-top box. For example, each of family members might use the same set-top box at different times. If recommendation is made by taking the whole family's user profile as a current user, then statistical information is caused to cover individual information. Therefore, there is a need for an improved method to further increase the accuracy of media data recommendation.

Some embodiments of the present invention will be described in detail with reference to the accompanying drawings. However, embodiments of the present invention can be implemented in various manners, and thus should not be construed to be limited to the specific embodiments disclosed herein. To the contrary, the embodiments provided are for the thorough and complete understanding of the present invention, and for completely conveying the scope of the present invention to those skilled in the art.

The programs described herein are identified based upon the application to which they are associated, within an embodiment of the present invention. However, it should be appreciated that any particular program nomenclature herein is used merely for convenience, and thus embodiments of the present invention should not be limited to use solely in any specific application identified and/or implied by such nomenclature.

As will be appreciated by one skilled in the art, aspects of the present invention may be embodied as a system, a method, and/or a computer program product. The computer program product may include a computer readable storage medium (or media) having computer readable program instructions thereon for causing a processor to carry out aspects of the present invention. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Referring now to FIG. 1, in which an exemplary computer system 10, including computing device 12, which is applicable to implement the embodiments of the present invention, is shown. Computer system 10 is only illustrative and is not intended to suggest any limitation as to the scope of use or functionality of embodiments of the present invention described herein.

As shown in FIG. 1, computing device 12 is shown in the form of a general-purpose computing device. The components of computing device 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 12 typically includes a variety of computer system readable media. Such media may be any available media that is accessible by computing device 12, and it includes both volatile and non-volatile media, removable and non-removable media.

System memory 28 can include computer system readable media in the form of volatile memory, such as random access memory (RAM) 30 and/or cache memory 32. Computing device 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computing device 12 may also communicate with one or more external devices 14 such as a keyboard, a pointing device, a display 24, etc.; one or more devices that enable a user to interact with computing device 12; and/or any devices (e.g., network card, modem, etc.) that enable computing device 12 to communicate with one or more other computing devices. Such communication can occur via Input/Output (I/O) interfaces 22. Still yet, computing device 12 can communicate with one or more networks such as a local area network (LAN), a general wide area network (WAN), and/or a public network (e.g., the Internet) via network adapter 20. As depicted, network adapter 20 communicates with the other components of computing device 12 via bus 18. It should be understood that although not shown, other hardware and/or software components could be used in conjunction with computing device 12. Examples, include, but are not limited to: microcode, device drivers, redundant processing units, external disk drive arrays, RAID systems, tape drives, and data archival storage systems, etc.

Figure 2:
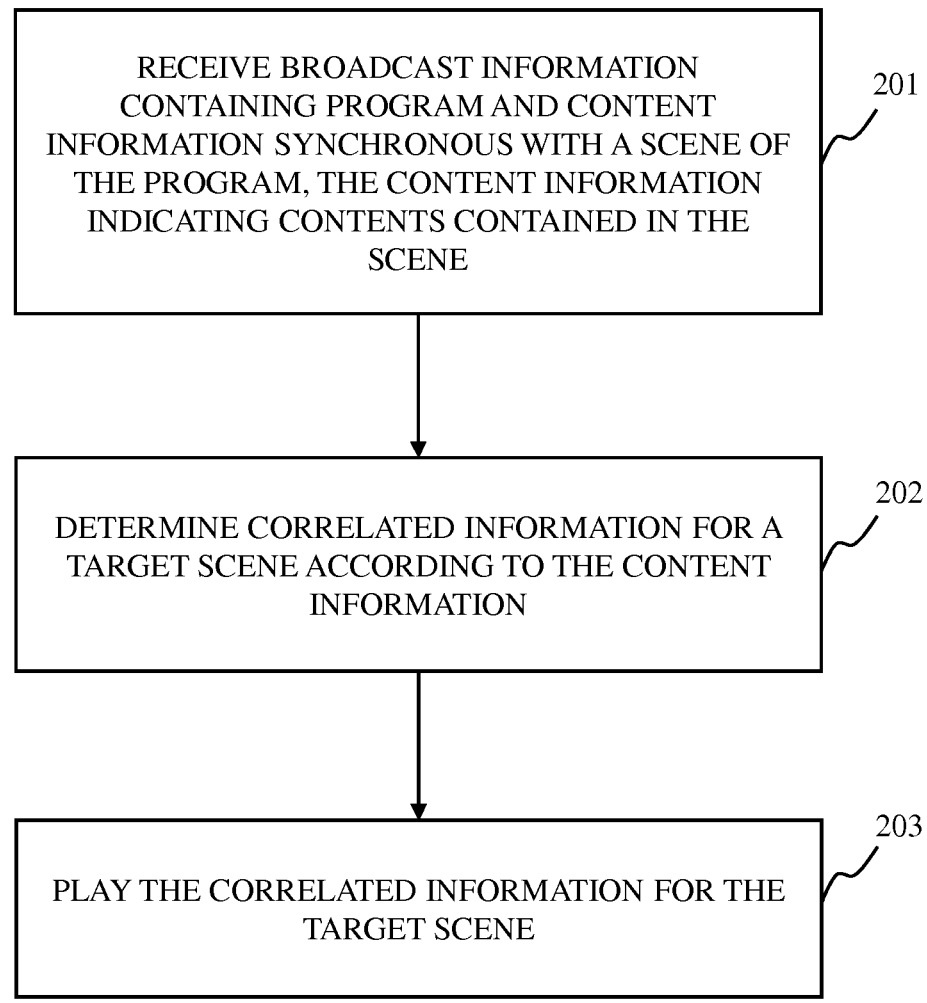
FIG. 2 is a flowchart of a method for processing broadcast information, in accordance with an embodiment of the present invention.

With reference now to FIG. 2, a description of a method for processing broadcast information according to one embodiment of the present invention, is presented. In step 201, broadcast information, which contains a program and content information, is received by, for example, receiving module 301 (see FIG. 3), synchronous with a scene of the program, the content information indicating contents contained in the scene.

Considering cable TV channels as an example, the main content in a cable TV channel include video and audio components of a TV program. According to different cable TV standards, the video and audio components of the TV program are combined in the cable TV channel in different manners. Generally, information used for error correction is also included in the channel, e.g., forward error correction information.

According to an embodiment of the present invention, the cable TV channel also includes content information that is transmitted synchronously with a scene of a TV program, such that particular content information corresponds to a particular scene of the TV program. Scenes of the TV program may be divided using various granularities. For example, a particular sequence of video may be used as the beginning of a new scene, or the sequence of a plot location may serve as the beginning of a new scene. The content information corresponding to the scene is used for describing the contents of the scene. For example, for a scene comprising scenery, the content information describes scenery, whereas for a scene that includes animals, the content information describes the animals. Those skilled in the art may understand that identical scenes may include different content information. For example, an indoor scene may have content information that includes various goods being present in the scene, including a table, a chair, a computer, a refrigerator, etc., whereas an outdoor scene may have content information that includes a tree, a field, a car, or a sidewalk. For other types of broadcast information, those skilled in the art may easily design a proper approach to dividing scenes.

The content information may be included within the cable TV channel in a manner similar to forward error correction information. Specifically, the content information may be included to the cable TV channel using time-division multiplexing, frequency-division multiplexing, or code-division multiplexing. Compared with video and audio of a TV program, the content information occupies a minimal amount of channel bandwidth.

In step 202, the content information is used by, for example, determining module 302 (see FIG. 3), to correlate particular information to a target scene. As described above, the content information is transmitted synchronously with a scene of a program. The content information can be used to determine the contents included in a particular scene currently being viewed by a user. One reasonable assumption is that the contents within the scene viewed by the user, may be of interest to the user. Accordingly, media data, which may be, for example, advertisements, announcements, or public service notices, which are highly correlated to the contents of interest to the user, can be selected.

Those skilled in the art are able to compose and design content that is related to, or corresponds to content information of a broadcast scene. For example, media data corresponding to scenery in a broadcast scene may include local geographical information, traffic information, nature-related information, and so on. Further, media data corresponding to animals may be taxonomic information and ecological information thereof.

According to an embodiment of the present invention, a relationship between content of a scene and media data, is stored in a set-top box supporting a TV receiving cable service. The cable base station may regularly push updated correlation information to the set-top box, via the cable TV channel. According to the relationship between the media data and the content contained in the target scene, a correlation between respective content information and each instance of content of the target scene can be achieved; further, media data that is highly correlated to the target scene can be selected based on the level of correlation between respective pairing of media data instances and content instances of the target scene.

In a case in which a particular instance of media data is selected as being highly correlated and corresponding to content of the target scene, those skilled in the art would readily expand this case by generation of a method, to be described below, for scenarios in which a plurality of media data, highly correlated to the content of target scenes may be selected.

According to an embodiment of the present invention, with respect to the instances of media data, a sum of correlations between the instance of media data and the respective contents of the target scene, is calculated as the media data's correlation with the contents of the target scene. For example, a correlation between a content item of a target scene, i, and media data item j is content_correlation$_{i,j}$, it follows that a correlation (correlation_scene$_{N,j}$) between the media_data j and a target scene N may be represented as:

$$\text{correlation\_scene}_{N,j} = \sum_{i=1}^{I} \text{correlation\_content}_{i,j} \quad (1)$$

where N denotes the $N^{th}$ scene in the TV program, and I denotes the amount of content contained in the $N^{th}$ scene.

According to another embodiment of the present invention, with respect to the instances of media data, the maximum correlation among correlations with respective contents in the target scene is used as the correlation between the media data and the target scene. If a correlation between the target scene content i and media data j is represented as correlation_content$_{i,j}$, then a correlation, (correlation_scene$_{N,j}$) between media data j and the target scene N may be represented as:

$$\text{correlation\_scene}_{N,j} = \text{MAX}(\text{correlation\_content}_{i,j}), i=1 \ldots I \quad (2)$$

where N denotes the $N^{th}$ scene in the TV program, and M denotes the amount of contents contained in the $N^{th}$ scene.

After obtaining a correlation between respective media data and the target scene, the media data with the maximum correlation may be selected as the media data corresponding to the target scene.

Figure 3:
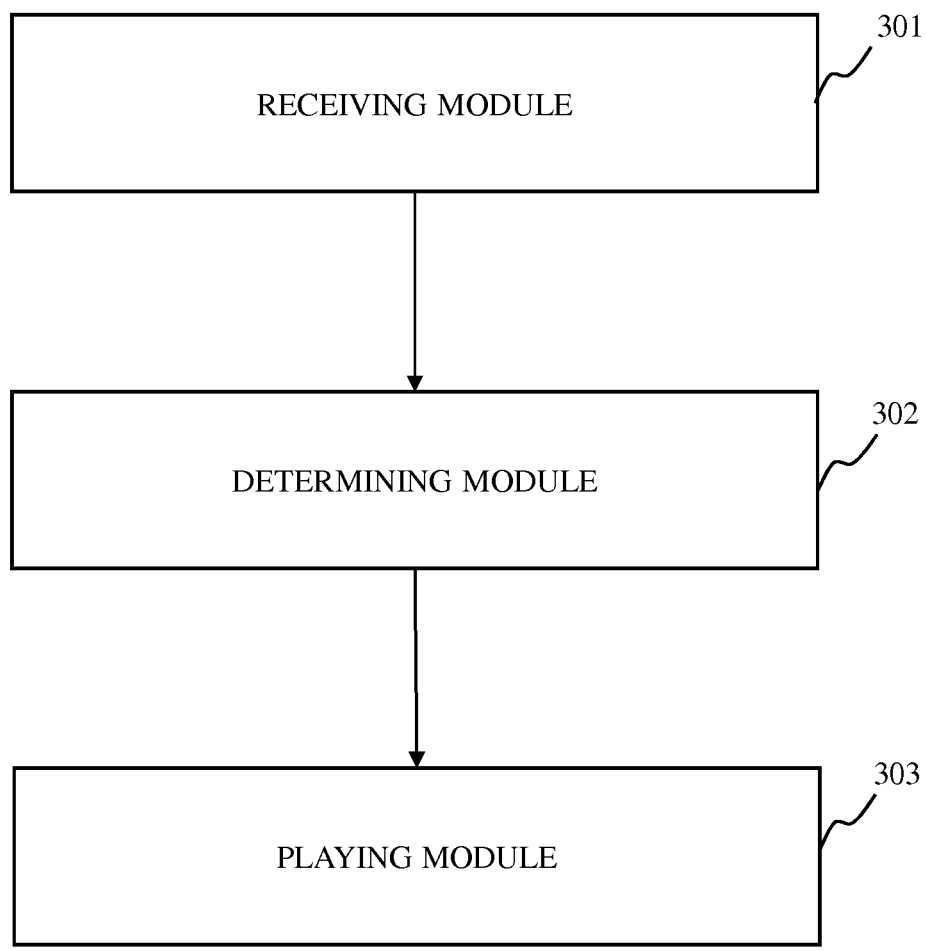
FIG. 3 is a block diagram of an apparatus for processing broadcast information in accordance with an embodiment of the present invention.

In step 203, the media data for the target scene is played, or presented, by, for example, playing module 303 (see FIG. 3). As described above, depending upon whether the media data format is text information or video information, the media data may be presented using spot, picture-in-a-picture, and/or superposition, for example.

According to the technical solution of an embodiment of the present invention, since content information is transmitted synchronously with the program scene within the broadcast stream of data, media data, which may be of interest to the user, can be analyzed by selecting scenes at a more granular level from the broadcast information. For example a scene may be a single frame of a video broadcast, as a most granular level, whereas a plurality of fames may be considered as representing a scene at a less granular level. In one regard, if the selected scene is being viewed currently, then the relevance of the real-time analysis of the content information of the scene is enhanced. In another regard, selecting a reduced granularity may result in the consideration of content information from a plurality of frames, which may overshadow individual content information, and may be avoided if individual content information is of concern. In this way, the accuracy of selecting media data with respect to a current user is improved.

In the example described above, the set-top box selects media data having the highest correlation to the target scene, considering all content contained in the target scene. However, to select the media data of most interest to the user, the content information corresponding to the historic viewing data of the user can be used, because otherwise the set-top box cannot determine the content of the target scene of most interest to the user. In some embodiments of the present invention, the content information corresponding to the user's viewing history is included in the user profile, and stored in the set-top box.

For example, contents in the current TV program scene comprise landscapes, persons, and cars. If the user profile indicates that most of the viewing history of TV programs played by the set-top box is racing, then the current user's interest may not be landscapes or persons, but cars. Accordingly, calculating a correlation between respective media data and the corresponding target scene, media data related to cars should have a greater weight than media data related to landscapes or persons. If the user profile indicates that the subject of most of the viewing history of TV programs played by the set-top box is tourism, then the current user's interest may not be persons or cars, but rather landscapes. Therefore, when calculating a correlation between respective media data and the corresponding target scene, media data related to landscapes should have a greater weight than correlated information related to cars or persons.

According to an embodiment of the present invention, a weight of respective contents contained in the target scene is calculated according to the user profile. The weight may also be regarded as a correlation between the user profile and the respective contents contained in the target scene. If it is inferred from the user profile that the user is more interested in a particular component of content than other contents in the target scene, then a greater weight is assigned to the particular component of content. In calculating a correlation between the media data and the target scene, the weight is used to give emphasis to correlations between the media data corresponding to the particular contents of interest, contained in the target scene, based on summarized content information of the user's viewing history in the user profile.

To indicate particular content a user may be interested in, a user tag may be generated, based on data collected in the user profile. The user tags are included in the user profile and indicate particular content of interest to the user. The user profile includes analysis of the user's viewing history of programs, and may include a summarization of the user's viewing history, such as a frequency count of a particular component of content, which can be used to establish a correlation relationship. In some embodiments of the present invention, the user profile may include multiple user tags corresponding to multiple content interests. The generation of user tags of the present invention, a correlation between the user tag and a particular component of content is stored in the set-top box. In some embodiments, the base station may analyze the user's viewing history and generate user tags, and with some frequency, push an updated correlation between the user tag and the particular type of content to the set-top box via the cable TV channel.

According to one embodiment of the present invention, a sum of correlations between a particular content and respective user tags is used as a weight of the content. A correlation between a content i, and a user tag k can be represented as correlation_usertag$_{i,k}$, and a weight of content i can be represented as $\alpha_i$. Accordingly, $\alpha_i$ may be represented as:

$$\alpha_i = \sum_{k=1}^{K} \text{correlation\_usertag}_{i,k} \quad (3)$$

where K denotes the amount of user tags generated according to the user profile.

According to another embodiment of the present invention, the maximum correlation among correlations between a certain content and respective user tags is used as a weight of the content.

$$\alpha_i = \text{MAX}(\text{correlation\_usertag}_{i,k}), k=1 \ldots K \quad (4)$$

where K denotes the amount of user tags generated according to the user profile.

Considering the weights of respective contents in the target scene, the above exemplary formulas for calculating correlation_scene between media data and the content of the target scene accordingly become:

$$\text{correlation\_scene}_{N,j} = \sum_{i=1}^{I} \alpha_i \times \text{correlation\_content}_{i,j} \quad (1')$$

$$\text{correlation\_scene}_{N,j} = \text{MAX}(\alpha_i \times \text{correlation\_content}_{i,j}), \quad (2')$$
$$i = 1 \ldots I$$

According to another embodiment of the present invention, in response to user instructions, the set-top box displays a list of contents contained in the target scene to the user, so that the user can select a content of interest. For example, a special button may be arranged on the remote controller of the set-top box; in response to detecting the user pressing the button, a list of contents contained in the target scene is displayed on the TV. In response to detecting the user's selection, one or more contents from the list of contents of the target scene, may be determined to be of interest to the user.

By use of a user selection method, a user's interest in the content of a target scene can be more accurately determined, and media data of appropriate interest may be presented to the user.

According to one embodiment of the present invention, the set-top box can relay the user's content selections to the cable base station, via a feedback channel. The feedback channel may be an uplink channel of the cable TV channels, or feedback may be relayed by another communication channel, for example, a TCP/IP connection. After obtaining the user's content selection information, the base station may perform further processing. For example, media data corresponding to contents of the user's interest may be sent to an email address registered to the user, or a link to the media data may be sent to some other terminal device, for example, a smartphone or a tablet device.

As described above, the broadcast information contains a program, and content information transmitted synchronously with a program scene, the content information descriptive of contents contained in the program scene. The content information is inserted by the base station sending the broadcast information. Considering a cable TV program as an example, the content information may be included or attached by video analysis technology. For example, contents contained in video may be recognized by image recognition technology, digital watermarking technology, etc. If the video contains subtitles, the subtitles may be parsed by natural language analysis technology, whereby content information is generated. If the broadcast information includes an audio component, contents referred to in the audio component may be determined by speech recognition and semantic analysis technology. Regardless of the type or source of content information, be it generated by video analysis, audio analysis, semantic analysis, or natural language analysis, the content information can be modified and included in the appropriate format, such that content information corresponding to a target scene of a broadcast program is included in the transmission of the cable TV channel program.

FIG. 3 is a block diagram of an apparatus for processing broadcast information according to one embodiment of the present invention.

Typically, the apparatus according to the embodiment of the present invention may be implemented by a computer program running on the exemplary computer system shown in FIG. 1. Although FIG. 1 shows a hardware structure of a general-purpose computer system, since the computer system runs the computer program and implements the solution according to the embodiments of the present invention, computing device 12 transforms from a general-purpose computing device to an apparatus according to an embodiment of the present invention.

In addition, although the apparatus according to one embodiment of the present invention is implemented by a same general-purpose computer system as a whole, various means or modules forming the apparatus are essentially implemented by independent hardware. It is because when the general-purpose computer runs the computer program, various means or modules are implemented in a time-sharing or processor core-sharing manner. Considering time-sharing implementation as an example, at a specific moment, the general-purpose computer system serves as hardware dedicated to implementing certain methods or modules; at different moments, the general-purpose computer system serves as different hardware dedicated to implementing different methods or modules. Therefore, the apparatus according to the embodiment of the present invention is a combination of a series of methods or modules implemented by means of hardware, not just a functional modular architecture. On the contrary, the apparatus according to the embodiment of the present invention may also be construed as an entity apparatus that implements a solution according to the embodiment of the present invention substantially in a hardware fashion.

An apparatus for processing broadcast information according to one embodiment of the present invention comprises: a receiving module configured to receive broadcast information, the broadcast information containing a program and content information synchronously transmitted with a scene of the program, the content information indicating contents contained in the scene; a determining module configured to determine media data for a target scene according to content information corresponding to the target scene; and a playing module configured to play the media data for the target scene.

Wherein the determining module comprises: a module configured to obtain contents contained in the target scene according to content information corresponding to the target scene; a module configured to obtain a first correlation between respective contents contained in the target scene and respective media data; a module configured to calculate a correlation between respective media data and the contents of the target scene according to the first correlation; and a module configured to select media data as being correlated the target scene, wherein the correlation between the selected media data and the contents of the target scene conforms to a predefined condition.

Wherein the determining module further comprises: a module configured to obtain a user profile; a module configured to select at least part of contents from contents corresponding to the target scene according to the user profile; and a module configured to determine media data corresponding to the at least part of contents of the target scene that is selected.

Wherein the module configured to select at least part of contents from contents corresponding to the target scene according to the user profile comprises: a module configured to obtain user tags indicated by the user profile; a module configured to obtain a second correlation between respective user tags and respective contents contained in a previous scene; a module configured to calculate a correlation between the respective contents and the user profile according to the second correlation; and a module configured to select contents from the at least part of contents, wherein correlations between the selected contents and the user profile conform to a predefined condition.

Wherein the determining module further comprises: a module configured to, in response to a user input, provide to the user a list of contents contained in the target scene; a module configured to, in response to a further user input, select at least part of contents from contents corresponding to the target scene; and a module configured to determine correlated information for the target scene according to the selected at least part of contents.

The apparatus further comprises: a module configured to send to a base station information on the at least part of contents.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing broadcast information, comprising:

receiving a broadcast transmission, selected by a user, which includes a recorded program of media data and content information that is transmitted synchronously with one or more scenes of the recorded program of the media data, and the content information corresponding to a target scene of the one or more scenes of the recorded program of media data currently viewed by the user, wherein contents of the target scene include one or more components within the target scene and are identified by the content information corresponding to the target scene supplemented by image recognition of, components identified within the target scene;

determining components of scenes of contents of media data recommendation candidates, based on content information included within the media data recommendation candidates, supplemented by image recognition of components of scenes of the contents of the media data recommendation candidates;

generating a user tag, based on viewing history of the user, wherein the user tag is included in a user profile and corresponds to one or more components within target scenes of media data previously viewed by the user, wherein the viewing history of the user exceeds a predetermined number of viewings;

generating a level of correlation between the one or more components of the contents within the target scene, and the candidate components of the scenes of the contents of the media data recommendation candidates, wherein the correlation level is based on a cumulative summation of user tags included in the user profile, found to correspond to the candidate components of the scenes of the contents of the media data recommendation candidates;

selecting a media data recommendation candidate, based on the level of correlation of the candidate components of the contents within one or more scenes of the media data recommendation candidate to the one or more components of the contents within the target scene of the recorded program of media data viewed by the user, wherein the level of correlation meets a pre-defined correlation condition; and presenting to the user, the media data recommendation candidate having the greatest level of correlation to the one or more components of the contents within the target scene of the recorded program, and meeting the pre-defined correlation condition.

2. The method of claim 1, wherein the selecting step includes:

determining a level of correlation between each instance of the candidate components of the media data recommendation candidates and the cumulative instances of the one or more components of the contents within the target scene that are indicated by the content information corresponding to the target scene; and in response to determining that the correlation level between an instance of the candidate components of the media data and the cumulative instances of one or more components within the target scene that are indicated by the content information conforms to a pre-defined correlation condition, determining a set of instance of media data from which the media recommendation candidates are selected for display to the user.

3. The method of claim 1, wherein the determining step includes:

storing a viewing history of the user;

receiving a user profile, including a viewing history of the user;

selecting a component within the target scene indicated by the content information of the viewing history of the user having a greatest frequency based, at least in part, on the user profile; and identifying the media data to be displayed based, at least in part, on the correlation of the media data to the component within the target scene indicated by the content information of the viewing history of the user, having a greatest frequency.

4. The method of claim 1, further comprising:

responsive to receiving a first input from a user to view content associated with the target scene, providing to the user a list of the components within the target scene indicated by the content information corresponding to the target scene;

responsive to receiving a second input from the user indicating a selection of the one or more components from the list of components within the target scene indicated by the content information of the target scene, generating a user tag corresponding to each of the one or more components within the target scene selected by the user from the list of components.

5. The method of claim 4, further comprising:

sending to a base station, the content indicated by the content information of the target scene of the scenes of the recorded program viewed by the user.

6. The method claim 1, further comprising:

responsive to receiving a first input of a broadcast transmission viewed by the user, including components identified within a target scene of the first input, generating a user tag corresponding to each of the components within the target scene of the first input, based on the user profile indicating user viewing of the first input; and responsive to receiving a second input of a broadcast transmission viewed by the user, including components identified within a target scene of the second input, wherein one or more of the components identified within the target scene of the second input correspond to one or more of the components identified with the target scene of the first input, generating a summation of the corresponding user tags and including the summation in the user profile.

7. A computer program product for processing broadcast information, the computer program product comprising:

a computer readable storage medium having stored thereon:

first program instructions programmed to receive a broadcast transmission selected by a user, which includes a recorded program of media data and content information that is transmitted synchronously with one or more scenes of the recorded program of the media data, and the content information corresponding to a target scene of the one or more scenes of the recorded program of media data currently viewed by the user, wherein contents of the target scene include one or more components within the target scene and are identified by the content information corresponding to the target scene, supplemented by image recognition of, components identified within the target scene;

second program instructions to determine components of scenes of contents of media data recommendation candidates, based on content information included within the media data recommendation candidates, supplemented by image recognition of components of scenes of the contents of the media data recommendation candidates;

third program instructions to generate a user tag, based on viewing history of the user, wherein the user tag is included in a user profile and corresponds to one or more components within target scenes of media data previously viewed by the user, wherein the viewing history of the user exceeds a predetermined number of viewings;

fourth program instructions to generate a level of correlation between the one or more components of the contents within the target scene, and the candidate components of the scenes of the contents of the media data recommendation candidates, wherein the correlation level is based on a cumulative summation of user tags included in the user profile, found to correspond to the candidate components of the scenes of the contents of the media data recommendation candidates;

fifth program instructions programmed to select a media data recommendation candidate, based on the level of correlation of the candidate components of the contents within one or more scenes of the media data recommendation candidate to the one or more components of the contents within the target scene of the recorded program of media data viewed by the user, wherein the level of correlation meets a pre-defined correlation condition; and sixth program instructions programed to present to the user, the media data recommendation candidate having the greatest level of correlation to the one or more components of the contents within the target scene of the recorded program, and meeting the pre-defined correlation condition.

8. The computer program product of claim 7, wherein the fourth program instructions include:

program instructions programmed to determine a level of correlation between each instance of the candidate components of the media data recommendation candidates and the cumulative instances of the one or more components of the contents within the target scene that are indicated by the content information corresponding to the target scene; and in response to determining that the correlation level between an instance of the candidate components of the media data and the cumulative instances of one or more components within the target scene that are indicated by the content information conforms to a pre-defined correlation condition, program instructions programmed to determine a set of instance of media data from which the media recommendation candidates are selected for display to the user.

9. The computer program product of claim 7, wherein the fourth program instructions include:
program instructions programmed to store a viewing history of the user;
program instructions programmed to receive a user profile, including a viewing history of the user;
program instructions programmed to select a component within the target scene indicated by the content information of the viewing history of the user, having a greatest frequency based, at least in part, on the user profile; and
program instructions programmed to identify the media data to be displayed based, at least in part, on the correlation of the media data to the component within the target scene indicated by the content information of the viewing history of the user, having a greatest frequency.

10. The computer program product of claim 7, wherein the fourth program instructions further comprise:
program instructions programmed to, responsive to receiving a first input from a user to view content associated with the target scene, provide to the user a list of the components within the target scene indicated by the content information corresponding to the target scene;
program instructions programmed to, responsive to receiving a second input from the user indicating a selection of the one or more components from the list of components within the target scene indicated by the content information of the target scene, generate a user tag corresponding to each of the one or more components within the target scene selected by the user from the list of components.

11. The computer program product of claim 10, further comprising:
seventh program instructions programmed to send to a base station the content indicated by the content information of the target scene of the scenes of the recorded program viewed by the user.

12. The computer program product of claim 7, wherein the fourth program instructions further comprise:
responsive to receiving a first input of a broadcast transmission viewed by the user, including components identified within a target scene of the first input, program instructions to generate a user tag corresponding to each of the components within the target scene of the first input, based on the user profile indicating user viewing of the first input; and
responsive to receiving a second input of a broadcast transmission viewed by the user, including components identified within a target scene of the second input, wherein one or more of the components identified within the target scene of the second input correspond to one or more of the components identified with the target scene of the first input, program instructions to generate a summation of the corresponding user tags and including the summation in the user profile.

13. A computer system for processing broadcast information, the computer system comprising:
a processor(s) set; and
a computer readable storage medium;
wherein:
the processor set is structured, located, connected and/or programmed to run program instructions stored on the computer readable storage medium; and
the program instructions include:
first program instructions programmed to receive a broadcast transmission selected by a user, which includes a recorded program of media data and content information that is transmitted synchronously with one or more scenes of the recorded program of the media data, and the content information corresponding to a target scene of the one or more scenes of the recorded program of media data currently viewed by the user, wherein contents of the target scene include one or more components within the target scene and are identified by the content information corresponding to the target scene, supplemented by image recognition of, components identified within the target scene;
second program instructions to determine components of scenes of contents of media data recommendation candidates, based on content information included within the media data recommendation candidates, supplemented by image recognition of components of scenes of the contents of the media data recommendation candidates;
third program instructions to generate a user tag, based on viewing history of the user, wherein the user tag is included in a user profile and corresponds to one or more components within target scenes of media data previously viewed by the user, wherein the viewing history of the user exceeds a predetermined number of viewings;
fourth program instructions to generate a level of correlation between the one or more components of the contents within the target scene, and the candidate components of the scenes of the contents of the media data recommendation candidates, wherein the correlation level is based on a cumulative summation of user tags included in the user profile, found to correspond to the candidate components of the scenes of the contents of the media data recommendation candidates;
fifth program instructions programmed to select a media data recommendation candidate, based on the level of correlation of the candidate components of the contents within one or more scenes of the media data recommendation candidate to the one or more components of the contents within the target scene of the recorded program of media data viewed by the user, wherein the level of correlation meets a pre-defined correlation condition; and
sixth program instructions programed to present to the user, the media data recommendation candidate having the greatest level of correlation to the one or more components of the contents within the target scene of the recorded program, and meeting the pre-defined correlation condition.

14. The computer system of claim 13, wherein the fourth program instructions include:
program instructions programmed to determine a level of correlation between each instance of the candidate components of the media data recommendation candidates and the cumulative instances of the one or more components of the contents within the target scene that are indicated by the content information corresponding to the target scene; and in response to determining that the correlation level between an instance of the candidate components of the media data and the cumulative instances of one or more components within the target scene that are indicated by the content information conforms to a pre-defined correlation condition, program instructions programmed to determine a set of instance of media data from which the media recommendation candidates are selected for display to the user.

15. The computer system of claim 13, wherein the fourth program instructions further comprise:

program instructions programmed to store a viewing history of the user;

program instructions programmed to receive a user profile, including a viewing history of the user;

program instructions programmed to select a component within the target scene, indicated by the content information of the viewing history of the user having a greatest frequency based, at least in part, on the user profile; and program instructions programmed to identify the media data to be displayed based, at least in part, on the correlation of the media data to the component within the target scene indicated by the content information of the viewing history of the user, having a greatest frequency.

16. The computer system of claim 15, wherein the computer system includes program instructions programmed to select content indicated by content information of the target scene, includes:

program instructions programmed to receive a set of user tags that are included in the user profile;

program instructions programmed to determine a set of correlation levels between the set of user tags and a first component within the target scene indicated by the content information of the target scene, each correlation level respectively corresponding to a user tag-to-first component of the tag-component pair, wherein each correlation level is determined by a similarity comparison of the content information associated with the first component of the content, and each user tag; and program instructions programmed to select content, wherein the set of correlation levels between the first component within the target scene indicated by the content information of the target scene, and the set of user tags, meet a pre-defined correlation condition.

17. The computer system of claim 13, wherein the second program instructions include:

program instructions programmed to, responsive to a first input from a user to view content within the target scene, provide to the user a list of components within the target scene indicated by the content information corresponding to the target scene; and program instructions programmed to, responsive to a second input from the user indicating a selection of one or more components from the list of components within the target scene, indicated by the content information of the target scene, generating a user tag corresponding to each of the one or more components within the target scene selected by the user from the list of components.

18. The computer system of claim 17, further comprising:

seventh program instructions programmed to send to a base station the content indicated by the content information of the target scene of the scenes of the recorded program viewed by the user.

19. The computer system of claim 13, wherein the fourth program instructions further comprise:

responsive to receiving a first input of a broadcast transmission viewed by the user, including components identified within a target scene of the first input, program instructions to generate a user tag corresponding to each of the components within the target scene of the first input, based on the user profile indicating user viewing of the first input; and responsive to receiving a second input of a broadcast transmission viewed by the user, including components identified within a target scene of the second input, wherein one or more of the components identified within the target scene of the second input correspond to one or more of the components identified with the target scene of the first input, program instructions to generate a summation of the corresponding user tags and including the summation in the user profile.

\* \* \* \* \*